US 8,621,061 B2

(12) United States Patent  
Melnyk et al.

(10) Patent No.: US 8,621,061 B2  
(45) Date of Patent: *Dec. 31, 2013

(54) ADAPTIVE BITRATE MANAGEMENT FOR STREAMING MEDIA OVER PACKET NETWORKS

(75) Inventors: Miguel A. Melnyk, Champaign, IL (US); Nicholas J. Stavrakos, Los Altos, CA (US); Fabian Breg, Savoy, IL (US); Andrew Penner, Champaign, IL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/557,086

(22) Filed: Jul. 24, 2012

(65) Prior Publication Data

US 2012/0290739 A1 Nov. 15, 2012

Related U.S. Application Data

(63) Continuation of application No. 13/190,238, filed on Jul. 25, 2011, now Pat. No. 8,230,105, which is a continuation of application No. 12/170,347, filed on Jul. 9, 2008, now Pat. No. 7,987,285.

(60) Provisional application No. 60/948,917, filed on Jul. 10, 2007.

(51) Int. Cl.  
*G06F 15/173* (2006.01)

(52) U.S. Cl.  
USPC ........... 709/223; 709/221; 709/227; 709/231; 370/312

(58) Field of Classification Search  
USPC .......................................... 709/233; 370/312  
See application file for complete search history.

(56) References Cited

U.S. PATENT DOCUMENTS 6,441,754 B1 * 8/2002 Wang et al. .................... 341/50  
6,738,427 B2 * 5/2004 Zetts ....................... 375/240.28  
(Continued)

FOREIGN PATENT DOCUMENTS

EP  1 202 487    5/2002  
EP  1202487     5/2002  
(Continued)

OTHER PUBLICATIONS

Toufik Ahmed (Adaptive Packet Video Streaming Over IP Networks: A Cross-Layer Approach "IEEE Journal on Selected Areas in Communications, vol. 23, No. 2, Feb. 2005").*

(Continued)

*Primary Examiner* — Wing F Chan  
*Assistant Examiner* — Razu Miah  
(74) *Attorney, Agent, or Firm* — Finnegan, Henderson, Farabow, Garrett & Dunner LLP (57) ABSTRACT

A method including receiving a receiver report from a terminal; estimating one or more network conditions of a media network based at least in part on the receiver report; determining an optimal session bitrate based on the estimated one or more network conditions; and providing media data to the terminal based on the optimal session bitrate.

20 Claims, 5 Drawing Sheets

(56) References Cited

U.S. PATENT DOCUMENTS

| | | | |
|---|---|---|---|
| 6,798,755 B2* | 9/2004 | Lillie et al. | 370/312 |
| 6,993,073 B2 | 1/2006 | Foong | |
| 7,366,780 B2* | 4/2008 | Keller et al. | 709/227 |
| 7,627,684 B2 | 12/2009 | Boucher et al. | |
| 7,653,539 B2 | 1/2010 | Yamanashi et al. | |
| 7,720,983 B2 | 5/2010 | Klemets et al. | |
| 7,747,764 B2 | 6/2010 | Batke et al. | |
| 7,764,668 B2 | 7/2010 | Yoshizawa et al. | |
| 7,779,443 B2 | 8/2010 | Kim | |
| 7,818,444 B2* | 10/2010 | Brueck et al. | 709/231 |
| 2001/0029457 A1 | 10/2001 | Shaffer et al. | |
| 2002/0010938 A1 | 1/2002 | Zhang et al. | |
| 2002/0103554 A1 | 8/2002 | Coles et al. | |
| 2002/0154694 A1 | 10/2002 | Birch | |
| 2002/0181595 A1 | 12/2002 | Obata et al. | |
| 2003/0023738 A1 | 1/2003 | Boivie et al. | |
| 2004/0068536 A1 | 4/2004 | Demers et al. | |
| 2004/0107284 A1 | 6/2004 | Koperda et al. | |
| 2004/0133683 A1* | 7/2004 | Keller et al. | 709/227 |
| 2004/0141732 A1 | 7/2004 | Sugiyama et al. | |
| 2004/0170179 A1 | 9/2004 | Johansson et al. | |
| 2004/0267445 A1 | 12/2004 | De Luca et al. | |
| 2005/0005020 A1 | 1/2005 | Rey et al. | |
| 2005/0021814 A1* | 1/2005 | Wang | 709/231 |
| 2005/0021830 A1* | 1/2005 | Urzaiz et al. | 709/234 |
| 2005/0036698 A1 | 2/2005 | Beom | |
| 2005/0105471 A1 | 5/2005 | Ido et al. | |
| 2005/0175093 A1 | 8/2005 | Haskell et al. | |
| 2005/0180502 A1 | 8/2005 | Puri | |
| 2005/0210155 A1 | 9/2005 | Oeda et al. | |
| 2005/0259947 A1 | 11/2005 | Wang et al. | |
| 2005/0262251 A1 | 11/2005 | Klemets et al. | |
| 2005/0276284 A1* | 12/2005 | Krause et al. | 370/538 |
| 2005/0283809 A1 | 12/2005 | Kim | |
| 2006/0083260 A1 | 4/2006 | Wang et al. | |
| 2006/0092867 A1* | 5/2006 | Muller et al. | 370/312 |
| 2006/0095943 A1 | 5/2006 | Dermircin et al. | |
| 2006/0156347 A1 | 7/2006 | Zhang et al. | |
| 2006/0165166 A1 | 7/2006 | Chou et al. | |
| 2006/0182027 A1 | 8/2006 | Conte et al. | |
| 2006/0184688 A1 | 8/2006 | Ganguly et al. | |
| 2006/0203831 A1 | 9/2006 | Yoshizawa et al. | |
| 2007/0091920 A1* | 4/2007 | Harris et al. | 370/468 |
| 2007/0146484 A1 | 6/2007 | Horton et al. | |
| 2007/0208557 A1 | 9/2007 | Li et al. | |
| 2008/0086570 A1 | 4/2008 | Dey et al. | |
| 2008/0120424 A1* | 5/2008 | Deshpande | 709/230 |
| 2008/0195743 A1* | 8/2008 | Brueck et al. | 709/231 |
| 2008/0198929 A1 | 8/2008 | Fujihara | |
| 2009/0013366 A1 | 1/2009 | You et al. | |
| 2009/0019178 A1 | 1/2009 | Melnyk et al. | |
| 2009/0106356 A1 | 4/2009 | Brase et al. | |
| 2009/0232220 A1 | 9/2009 | Neff et al. | |
| 2009/0254657 A1 | 10/2009 | Melnyk et al. | |
| 2009/0327698 A1 | 12/2009 | Baker et al. | |
| 2010/0074535 A1 | 3/2010 | Bennett | |
| 2010/0205318 A1 | 8/2010 | Melnyk et al. | |

FOREIGN PATENT DOCUMENTS

| | | |
|---|---|---|
| EP | 1 294 193 | 3/2003 |
| WO | WO 2005/022845 | 3/2005 |
| WO | 2007018841 | 2/2007 |
| WO | WO 2007/018841 | 2/2007 |
| WO | 03026232 | 3/2007 |
| WO | WO 2008/098249 | 8/2008 |

OTHER PUBLICATIONS

Baldo, Nicola, et al., "RTCP Feedback Based Transmission Rate Control for 3G Wireless Multimedia Streaming," IEEE, 0-7803-8523-3/04 (2004), pp. 1817-1821.

Basso, Andrea, et al., "Performance Evaluation of MPEG-4 Video over Realistic EDGE Wireless Networks," IEEE, 0-7803-7442-8/02 (2002), pp. 1118-1122.

Qu, Qi, et al., "Network-Aware Source-Adaptive Video Coding for Wireless Applications," 0-7803-8847-X/04 MILCOM (2004), Military Communications Conference, pp. 848-854.

Schulzrinne, H. et al., "RTP: A Transport Protocol for Real-Time Applications," Network Working Group, Jul. 2003, pp. 103.

International Search Report and Written Opinion of the International Searching Authority for International Application No. PCT/US2008/008556, mailed Oct. 10, 2008, 12 pages.

International Search Report and Written Opinion mailed Apr. 7, 2010 for International Appl. No. PCT/US2010/000302.

Office Action mailed on Mar. 18, 2010 in related U.S. Appl. No. 12/170,347, filed Jul. 9, 2008.

Office Action mailed on Sep. 1, 2010 in related U.S. Appl. No. 12/170,347, filed Jul. 9, 2008.

Office Action mailed Sep. 24, 2010 in related U.S. Appl. No. 12/416,085, filed Mar. 31, 2009.

International Search Report and Written Opinion mailed Sep. 13, 2010 for International Appl. No. PCT/US2010/000959.

Notice of Allowance and Examiner Interview Summary mailed on Mar. 25, 2011 in related U.S. Appl. No. 12/170,347, filed Jul. 9, 2008.

Notice of Allowance and Examiner Interview Summary mailed on Mar. 29, 2011 in related U.S. Appl. No. 12/416,085, filed Mar. 31, 2009.

Melnyk, M. et al. "Adaptive Bitrate Management for Streaming Media Over Packet Networks"; U.S. Appl. No. 12/416,085, filed Mar. 31, 2008; pp. 1-46.

Office Action mailed May 12, 2011 in related U.S. Appl. No. 12/368,260, filed Feb. 9, 2009.

Melnyk, M. et al. "Method for Controlling Download Rate of Real-Time Streaming as Needed by Media Player," U.S. Appl. No. 12/368,260, filed Feb. 9, 2009; pp. 1-44.

International Preliminary Report on Patentability and Written Opinion for PCT Application No. PCT/US2010/000959 issued Oct. 4, 2011.

Office Action mailed Oct. 25, 2011 in related U.S. Appl. No. 13/190,238, filed Jul. 25, 2011.

Office Action mailed Nov. 23, 2011 in related U.S. Appl. No. 13/194,761, filed Jul. 29, 2011.

Office Action dated Aug. 4, 2011 in related European Application No. 08780143.7 filed Jan. 28, 2010.

Final Office Action dated Nov. 17, 2011, in related U.S. Appl. No. 12/368,260, filed Feb. 9, 2009.

Office Action dated Apr. 4, 2012, in related European Application No. 08780143.7, filed Jan. 28, 2010.

Notice of Allowance mailed Apr. 25, 2012 for U.S. Appl. No. 13/194,761.

Notice of Allowance mailed Mar. 29, 2012 for U.S. Appl. No. 13/190,238.

International Search Report and Written Opinion for International Application No. PCT/US2010/002762 mailed May 19, 2011.

International Preliminary Report on Patentability for International Application No. PCT/US2010/002762 mailed Apr. 26, 2012.

European Patent Office, Communication enclosing the extended European search report for European Application No. 13000979.8, dated Apr. 17, 2013, 6 pages.

U.S. Patent and Trademark Office; Final Office Action dated Oct. 10, 2013 for U.S. Appl. No. 13/596,916, 21 pages.

\* cited by examiner

ADAPTIVE BITRATE MANAGEMENT FOR STREAMING MEDIA OVER PACKET NETWORKS

CROSS REFERENCE TO RELATED PATENTS

This application is a continuation of U.S. application Ser. No. 13/190,238, filed Jul. 25, 2011 now U.S. Pat. No. 8,230,105, "Adaptive Bitrate Management For Streaming Media Over Packet Networks," which is a continuation of U.S. application Ser. No. 12/170,347, filed Jul. 9, 2008 now U.S. Pat. No. 7,987,285, "Adaptive Bitrate Management For Streaming Media Over Packet Networks," which claims the benefit of U.S. Provisional Application No. 60/948,917, filed Jul. 10, 2007, "Adaptive Bitrate Management For Streaming Media Over Packet Networks," all of which are incorporated herein by reference in their entirety.

BACKGROUND INFORMATION

Rate control is essential for media streaming over packet networks. The challenge in delivering bandwidth-intensive content like multimedia over capacity-limited, shared links is to quickly respond to changes in network conditions by adjusting the bitrate and the media encoding scheme to optimize the viewing and listening experience of the user. In particular, when transferring a fixed bitrate over a connection that cannot provide the necessary throughput, several undesirable effects arise. For example, a network buffer may overflow resulting in packet loss causing garbled video or audio playback, or a media player buffer may underflow resulting in playback stall. Standard bodies have recommended protocols to address these issues. Internet Engineering Task Force (IETF), in RFC 3550, specifies RTCP as the fundamental building block to implement bit rate/packet rate control in streaming media. Several extensions to RTCP, suited for high capacity networks, follow this original recommendation.

Even with these recommended protocols, delivering a multimedia session over wireless networks can be particularly challenging, due in part to the following:

Sudden Adjustment of nominal transmission rate: Due to interference, fading, etc, 3+G networks negotiate physical layer parameters on the fly. Nominal transmission bitrates can change by a factor of 10;

Packet Loss: caused by either link transmission errors or by network congestion;

Reduction of Effective bandwidth: The wireless link is a shared resource at Layer 2, with MAC (Media Access Control) mechanism and scheduling. This means that an increased load presented by other wireless terminals in the same sector can reduce the effective bandwidth or capacity that a terminal will see; and Limited Capacity: Available capacity is typically a fraction to that obtained in traditional wireline internet access technologies, where currently capacity is not an issue. Fixed internet media sessions can typically offer to the network loads between 250 and 400 kbps. Despite the fact that current 3G cellular networks can sustain throughputs of 500 kbps and above, the total bitrate budget for a wireless multimedia session is typically kept under 150 kbps to ensure scalability.

For wireless mobile devices, providing a good experience in streaming media sessions is particularly difficult, due to Infrequent and incomplete network state information. The typical wireless media player support RTCP receiver report as defined in RFC 3550, and the report generation frequency is fixed. As a result, the network state information obtained at the sender end is limited and sporadic. In its Packet Streaming Service specification, 3GPP recommends several extensions to the basic IETF RTCP Receiver Report (i.e. RTCP Extended Reports, or XR). Unfortunately, very few handsets implement these enhancements;

Different media streams are handled separately. Despite the fact that they are both transmitted over the same network link, audio and video streams are handled separately by RTCP. Both RTCP reports provide state information about the same network, therefore a joint analysis; and Low bitrates available: The bitrate budget for a wireless multimedia session is generally very low (under 150 kbps). The adjustment of audio and video bitrates can have large perceptual impact on the session, and the total available network bitrate, even for 3G networks, can fall well below acceptable quantities. With these issues, to wireless networks and wireless mobile devices it has been difficult to set up a consistent streaming media session.

DETAILED DESCRIPTION OF DRAWINGS

Reference will now be made in detail to the exemplary embodiments consistent with the invention, the examples of which are illustrated in the accompanying drawings. Wherever possible, the same reference numbers will be used throughout the drawings to refer to the same or like parts.

Adjusting the bitrate of streaming media sessions according to instantaneous network capacity can be a critical function required to deliver streaming media over wireless packet networks. Adaptive bitrate management is a comprehensive framework and method that enables the delivery of self-adjusting streaming sessions to media players, for example, such as standard 3GPP-compliant media players. Adaptive bitrate management includes, among other things, an adaptive bitrate controller and a variable bitrate encoder, both of which allow the adaptive bitrate management the ability to implement joint session bitrate management for audio, video and/or other streams simultaneously.

Figure 1:
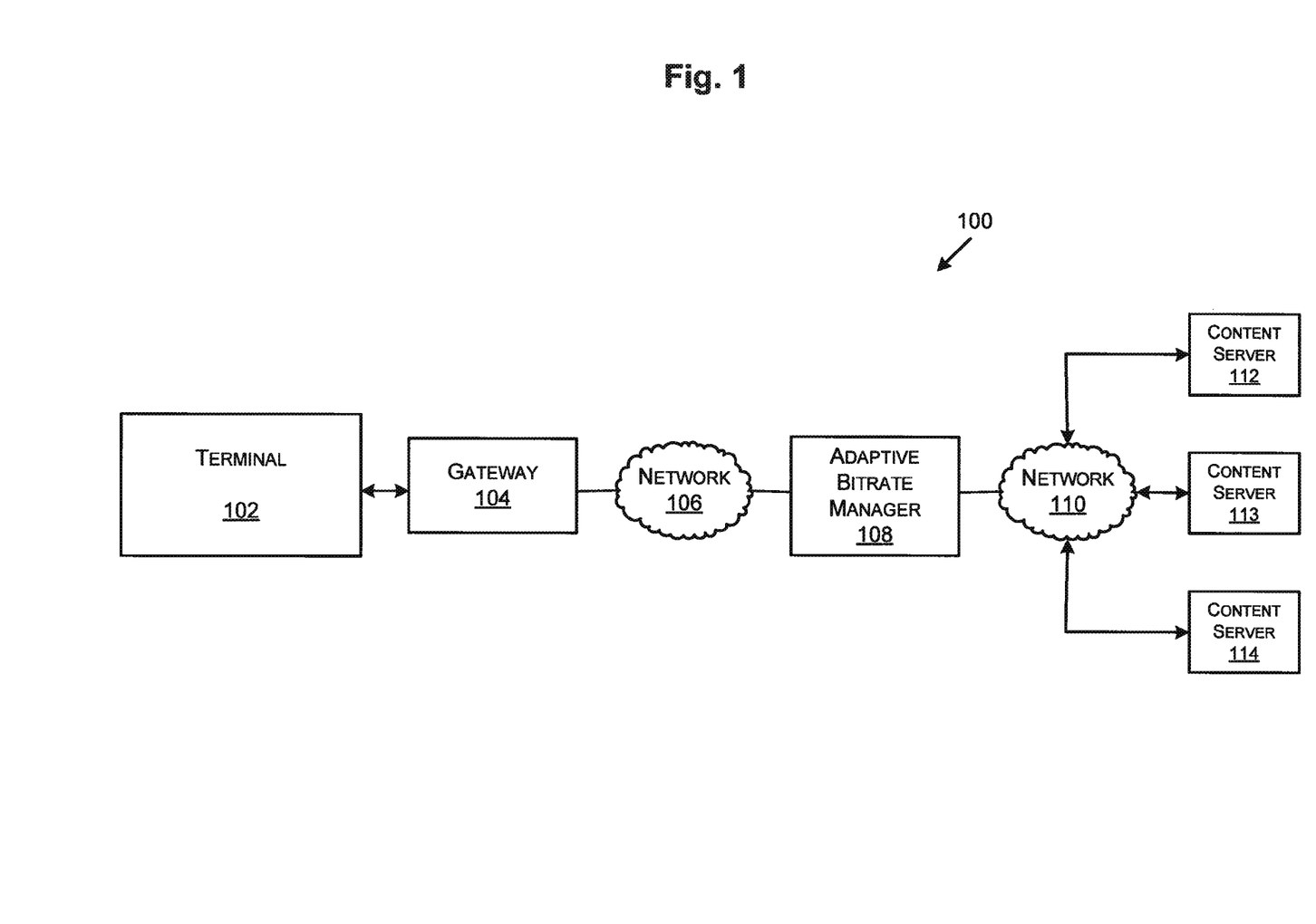
FIG. 1 is a block diagram of an exemplary system.

FIG. 1 is a block diagram of an exemplary system. Exemplary system 100 can be any type of system that transmits data packets over a network. For example, the exemplary system can include a mobile terminal accessing streaming media data from content servers through the Internet. The exemplary system can include, among other things, a terminal 102, a gateway 104, one or more networks 106, 110, an adaptive bitrate manager 108, and one or more content servers 112-114.

Terminal 102 is a hardware component including software applications that allow terminal 102 to communicate and receive packets corresponding to streaming media. Terminal 102 provides a display and one or more software applications, such as a media player, for displaying streaming media to a user of terminal 102. Further, terminal 102 has the capability of requesting and receiving data packets, such as data packets of streaming media, from the Internet. For example, terminal 102 can send request data to content servers 112-114 for a particular file or object data of a web page by its URL, and the content server of the web page can query the object data in a database and send the corresponding response data to terminal 102. In some embodiments, response data may be routed through adaptive bitrate manager 108.

While terminal 102 can be a wired terminal, some embodiments of the invention may prefer using a mobile terminal because mobile terminals are more likely to be in networks that would benefit more from an adaptive bitrate manager. The network connection tends to be less stable as compared to wired network connection due to, for example, the changing position of the mobile terminal where data rate transmissions between the mobile terminal and the network can fluctuate, in some cases quite dramatically.

Gateway 104 is a device that converts formatted data provided in one type of network to a particular format required for another type of network. Gateway 106, for example, may be a server, a router, a firewall server, a host, or a proxy server. Gateway 104 has the ability to transform the signals received from terminal 102 into a signal that network 106 can understand and vice versa. Gateway 104 may be capable of processing audio, video, and T.120 transmissions alone or in any combination, and is capable of full duplex media translations.

Networks 106 and 110 can include any combination of wide area networks (WANs), local area networks (LANs), or wireless networks suitable for packet-type communications, such as Internet communications. Further, networks 106 and 110 can include buffers for storing packets prior to transmitting them to their intended destination.

Adaptive bitrate manager 108 is a server that provides communication between gateway 104 and content servers 112-114. Adaptive bitrate manager 108 can optimize performance by adjusting a streaming media bitrate according to the connection, i.e., media network, between adaptive bitrate manager 108 and terminal 102. Adaptive bitrate manager 108 can include optimization techniques, further described below.

Content servers 112-114 are servers that receive the request data from terminal 102, process the request data accordingly, and return the response data back to terminal 102 through, in some embodiments, adaptive bitrate manager 108. For example, content servers 112-114 can be a web server, an enterprise server, or any other type of server. Content servers 112-114 can be a computer or a computer program responsible for accepting requests (e.g., HTTP, RTSP, or other protocols that can initiate a media session) from terminal 102 and serving terminal 102 with streaming media.

Figure 2:
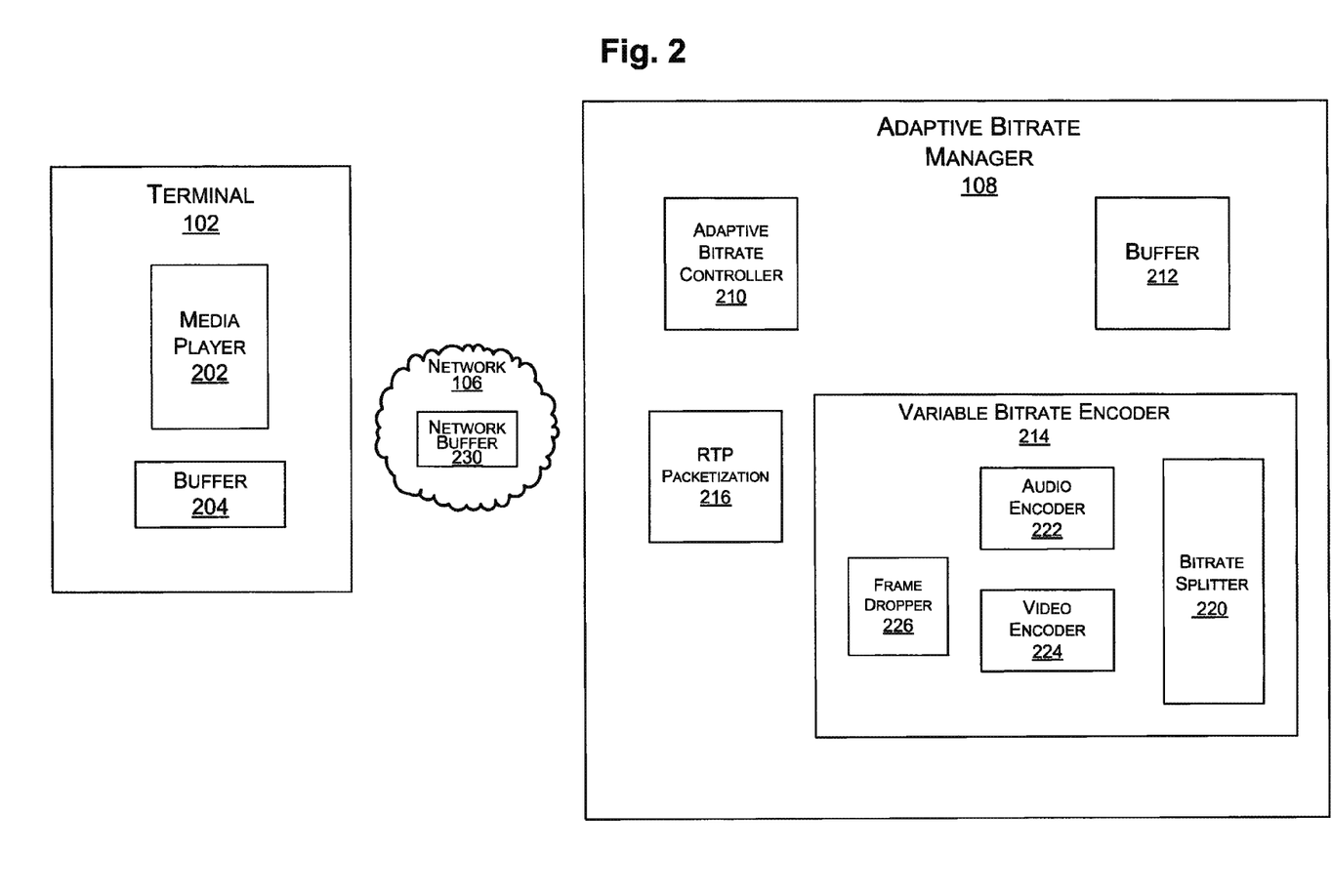
FIG. 2 is a block diagram illustrating an embodiment of the exemplary system of FIG. 1.

FIG. 2 is a block diagram illustrating an embodiment of the exemplary system of FIG. 1. Terminal 102 may include, among other things, a media player 202 and a buffer 204. Adaptive bitrate manager 108 can include, among other things, an adaptive bitrate controller 210, a buffer 212, a variable bitrate encoder 214, and a Real-time Transport Protocol (RTP) packetization 216.

Media player 202 is computer software for playing multimedia files (such as streaming media) including video and/or audio media files. Such popular examples of media player 202 can include Microsoft Windows Media Player, Apple Quicktime Player, and RealOne Player. In some embodiments, media player 202 decompresses the streaming video or audio using a codec and plays it back on a display of terminal 102. Media player 202 can be used as a stand alone application or embedded in a web page to create a video application interacting with HTML content. Further, media player 202 can communicate with adaptive bitrate manager 108 by sending RTCP receiver reports.

Buffer 204 (also known as terminal buffer 204) is a software program and/or a hardware device that temporarily stores multimedia packets before providing the multimedia packets to media player 202. In some embodiments, buffer 204 receives the multimedia packets from adaptive bitrate manager 108 via network 106. These packets can be configured based on the real-time transport protocol (RTP). In some embodiments, buffer 204 receives the multimedia packets from a device other than adaptive bitrate manager 108. Once buffer 204 receives multimedia packets, it can provide the stored multimedia packets to media player 202. While FIG. 2 illustrates that terminal buffer 204 and media player 202 are separate components, one of ordinary skill the art will appreciate that terminal buffer 204 can be a part of media player 202. Further, while FIG. 2 illustrates only a single buffer, one of ordinary skill the art will appreciate that multiple buffers can exist, for example, one or more buffers for audio media packets and one or more buffers for video media packets.

Adaptive bitrate controller 210 of adaptive bitrate manager 108 is a software program and/or hardware device that periodically receives RTCP receiver reports from terminal 102 and provides an optimal session bitrate to be used during the next period for encoding multimedia data to be sent to terminal 102. In some embodiments, adaptive bitrate controller 210 includes a buffer for storing the current and previous RTCP receiver reports. To compute the optimal session bitrate, adaptive bitrate controller 210 uses one or more network state estimators for estimating the state of the streaming media network and computing the optimal session bitrate to be used in the next RTCP interval. For example, these network state estimators can estimate a media time in transit (MTT), a bitrate received at terminal 102, a round trip time estimate (RTTE), and a packet loss count. Adaptive bitrate controller 210 can use the history and statistics of the estimator to implement different control algorithms to compute the optimal session bitrate. Further, adaptive bitrate controller 210 may update the optimal session bitrate by determining the stability of the streaming media network. This can be done by checking the newly computed estimators for compliance to one or more stability criterion. Using the estimations and the stability criterion, adaptive bitrate controller 210 can determine whether to adjust the outgoing bitrate or keep the current outgoing bitrate unchanged for the next period. After this determination, adaptive bitrate controller 210 provides the optimal session bitrate value to variable bitrate encoder 214.

Buffer 212 of adaptive bitrate manager 108 is a software program and/or a hardware device that temporarily stores media data before providing the media data to variable bitrate encoder 214. In some embodiments, buffer 212 receives the media data from one or more content servers 112-114 via network 110. In some embodiments, buffer 212 receives the media data from a device other than content servers 112-114.

Variable bitrate encoder 214 of adaptive bitrate manager 108 is a software program and/or hardware device that receives optimal session bitrate data from adaptive bitrate controller 210 and provides, to RTP packetization 216, audio and/or video data that are encoded at a bitrate matching the optimal session bitrate provided by adaptive bitrate controller 210. Variable bitrate encoder can include, among other things, a bitrate splitter 220, an audio encoder 222, a video encoder 224, and, for some embodiments, a frame dropper 226.

Bitrate splitter 220 is a software program and/or a hardware device that receives the optimal session bitrate data from adaptive bitrate controller 210 and allocates optimal bitrates to be used when encoding the audio and video media data during the next interval. The allocation is such that the summation of bitrates for all tracks, when combined, can be substantially equal to the optimal session bitrate specified by adaptive bitrate controller 210. For example, this allocation could be based on a predetermined allocation, user preference, optimal performance data, privileging one type of data over the other, the amount of audio and video data to be provided, and/or any combination of the above. For example, bitrate splitter 220 may privilege audio quality in a way that if a reduced bitrate is specified, bitrate splitter 220 will reduce the video bitrate first and postpone reducing the audio bitrate as much as possible.

Audio encoder 222 and video encoder 224 are software programs and/or hardware devices that receive their respective bitrate allocation from bitrate splitter 220 and provide outgoing media data encoded to match the bitrate of their respective bitrate allocation for the next RTCP interval. Both audio encoder 222 and video encoder 224 receive their respective media data from buffer 212 and output this media data according to its respective bitrate allocation from bitrate splitter 220. After the bitrate has been determined for both audio and video, it is the responsibility of each encoder to deliver maximum quality in the corresponding media track. For example, audio encoder 222 can generate variable bitrates by adjusting spectral quantization and cutoff frequency. Further, video encoder 224 can generate variable bitrates, for example, by adjusting Discrete Cosine Transform (DCT) coefficient quantization or by introducing frame dropping. This frame dropping can be executed, when needed, by frame dropper 226.

Frame dropper 226 is a software program and/or a hardware device that can be triggered when the desired bitrate is less than a quality threshold. This threshold can be codec dependent, and represents the bitrate value below which the use of coarser quantization leads to intolerable artifacts in the image. Frame dropper 226 can dynamically determine a frame dropping rate based on the desired video bitrate and the bitrate being generated by video encoder 224. To compensate inherent bitrate fluctuations in the video bitrate at the output of the encoder, frame dropper 226 can dynamically update the dropping rate by using a sliding window covering the byte size history of recently encoded frames.

RTP packetization 216 is a software program and/or a hardware device that receives the audio and video media data from audio encoder 222 and video encoder 224 and translates this data into a packet format. RTP defines a standardized packet format for delivering audio and video over the Internet. Besides carrying the audio and media data, these packets can include, among other things, a payload-type identifier for identifying the type of content, a packet sequence number, time stamping for allowing synchronization and jitter calculations, and delivery monitoring data. This type of data can later assist adaptive bitrate controller 210 in determining the quality of service provided by the network when adaptive bitrate controller 210 receives a corresponding RTCP receiver report from terminal 102. Upon translating this data into a packet format, RTP packetization 216 transmits the data through network buffer 230 of network 106 to terminal buffer 204 of terminal 102. In addition adaptive bitrate manager 108 saves the history of sent RTP packets in the audio and video tracks. This history data can include, among other things, the time that each packet is sent, the sequence number, and the size of each RTP packet.

Figure 3:
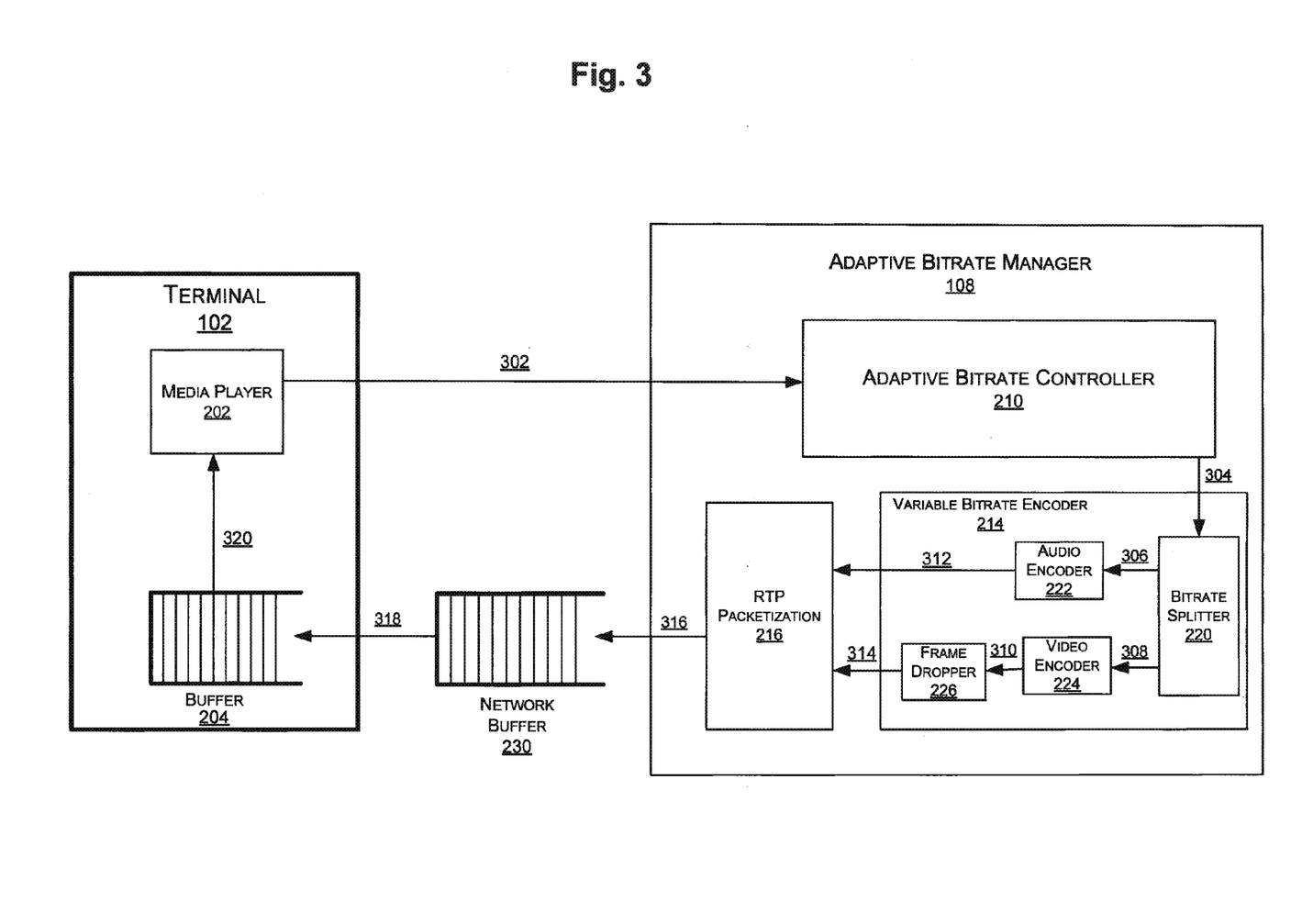
FIG. 3 is a functional diagram illustrating an exemplary communication flow in the exemplary system of FIG. 2.

FIG. 3 is a functional diagram illustrating an exemplary communication flow in the system of FIG. 2. It is assumed for purposes of explaining this exemplary embodiment that terminal 102 has already received at least some of the media data of the requested media data package. Further, it is assumed that the media data package includes both audio and video media data. After receiving packets, media player 202 transmits (302) an RTCP receiver report to adaptive bitrate manager 108.

RTCP is a protocol for providing quality control information for an RTP flow, such as the transmission provided by RTP packetization 216 of adaptive bitrate manager 108. More specifically, RTCP partners with RTP packetization 216 of adaptive bitrate manager 108 in the delivery and packaging of multimedia data. In some embodiments, media player 202 periodically transmits the RTCP receiver report. RTCP receiver report can provide feedback on the quality of service being provided by RTP packetization 216. While RTP/RTCP is used as an exemplary embodiment to explain the adaptive bitrate control method, one of ordinary skill could appreciate that this adaptive bitrate control method is applicable to any protocol that fulfills the functions of media transport with sequencing and timing information and media transport feedback with information about received packets (covering sequencing, timing, loss rate, etc.)

Further, in some embodiments, the receiver report can be a single report having both audio and video report data or it can be separated into multiple reports (such as in the RTCP case), for example, such as a receiver report for audio report data and another receiver report for video report data. The receiver report data can include, among other things, data regarding the sequence number of the most recently received RTP packet at terminal 102, the timestamp of the last packet received by terminal 102 reported in the RTCP receiver report, the number of bits sent from this report, a round trip time, and a number of packets lost.

After receiving the receiver report, adaptive bitrate controller 210 can estimate the state of the network for determining whether to update the session bitrate for the next period. Adaptive bitrate controller 210 can save the newly received receiver report in a cumulative history and record the time at which the packet was received. To estimate the state of the network, adaptive bitrate controller 210 can combine data from the received RTCP receiver report, the previously received RTCP receiver reports stored by the adaptive bitrate manager 108, and the history of sent RTP packets stored by adaptive bitrate manager 108. Adaptive bitrate controller can estimate the following exemplary data by using network state estimators:

Media Time in Transit (MTT), computed as the difference between the timestamp of the most recently sent RTP packet and the timestamp of the last RTP packet received by the player reported in RTCP receiver report;

Bitrate received, computed as the bits received between the current and previously received RTCP receiver reports, divided by the time elapsed between these two receiver reports. The bits received between receiver reports are computed by cross referencing sequence numbers in the receiver report with the history of bytes sent stored at adaptive bitrate manager 108;

Round Trip Time Estimate (RTTE) can be obtained by averaging a number of the lower MTT values stored at the adaptive bitrate manager 108. For example, RTTE could be calculated by averaging the lowest 3 MTT values out of all stored MTT values for that streaming media network. Further, adaptive bitrate manager 108 can calculate the RTTE from data within an RTCP sender report. While these exemplary embodiments are illustrated, any method can be used to estimate a round trip time for the streaming media network; and Packet Loss count, captured directly from RTCP receiver report.

Adaptive bitrate controller 210 can use these estimates to implement several different control algorithms. For example, the Streaming Media stability criterion can be used to compute the session bitrate for the next RTCP interval.

Adaptive bitrate controller 210 uses the stability criterion to determine the stability of the streaming media network. While any number of algorithms can be used to determine the stability, one exemplary embodiment compares the estimated MTT with the RTTE. If the MTT and the RTTE remain close, adaptive bitrate controller 210 can determine that the streaming media network can properly support the current bitrate. Further, by comparing the bitrate received with the current bitrate session, adaptive bitrate controller 210 can determine that the network can cope with the load imposed by adaptive bitrate manager 108.

Adaptive bitrate controller 210 uses the estimations and the stability criterion to implement control algorithms for discovering the network capacity and adjusting the session bitrate accordingly. Adaptive bitrate controller 210 can define the variations of the control algorithms to operate in two different modes: (1) acquisition mode and (2) normal mode. While two modes have been illustrated in this exemplary embodiment, one of ordinary skill in the art will appreciate that multiple modes of operation can be defined.

In the normal mode, adaptive bitrate controller 210 operates in the steady state condition, indicating that the network is either maintaining or incrementally increasing the effective capacity seen by the system. In some embodiments, while operating in normal mode, the control algorithms can increase the session bitrate while the MTT is not increasing and the bitrate received remains close to the current session bitrate.

Adaptive bitrate controller 210 generally triggers the acquisition mode when it detects high packet loss, a sudden increase in the MTT, and/or a value of the MTT higher than a threshold (MTT threshold), which can be a fixed value or can be obtained dynamically for an adaptive control mechanism. Once triggered, acquisition mode sets the optimal session bitrate to a value, such as the bitrate received or a fraction of the received bitrate. Because the bitrate received can be the best estimation of the actual bitrate that the network can support at that particular point in time, adaptive bitrate manager 108 should quickly return back to a stable condition. In some embodiments, the new session bitrate is simply set to be a fraction of the current session bitrate.

In this embodiment, while only terminal 102 is illustrated for communicating with adaptive bitrate manager 108, one of ordinary skill in the art will appreciate that multiple terminals can communicate with adaptive bitrate manager 108, where each of the terminals can be located in substantially different network environments. Such environments can vary significantly, as different underlying wireless technologies and fixed network topologies can be used. Therefore, for some embodiments, it may be desirable to discover characteristics of the network environment beforehand so that key parameters in the framework are adjusted automatically. For example, adaptive bitrate controller 210 could set the MTT threshold at the beginning of the multimedia session to a value correlated to the RTTE. In this way, the system can attempt to follow the general stability criterion provided by adaptive bitrate controller 210. As indicated above, this stability criterion could be based on, independent of the network environment (a prior unknown), the comparison between the MTT and the RTTE, which is largely advantageous given that the actual network infrastructure type can rarely be determined a priori. In some embodiments, the optimal session bitrate can be updated by determining the difference between the MTT and the RTTE and adjusting the session bitrate according to the difference. For example, the larger the difference, the greater adjustment from the current session bitrate to an optimal session bitrate. In some embodiments, the MTT used for this determination can be based on the one or more historical values of MTT.

Using the control algorithms to compute a session bitrate update as described above, adaptive bitrate controller 210 determines an optimal session bitrate for transmitting media data to terminal 102. Adaptive bitrate controller 210 provides (304) the optimal session bitrate data to bitrate splitter 220 of variable bitrate encoder 214. Upon receiving the optimal session bitrate data, bitrate splitter 220 allocates the optimal session bitrate between the audio and video streams. For example, this allocation could be based on a predetermined allocation, a user preference optimal performance data, privileging one type of data over the other, the amount of audio and video data to be provided, and/or any combination of the above. For example, bitrate splitter 220 may privilege audio quality in a way that if a reduced bitrate is specified, bitrate splitter 220 reduces the video bitrate first and postpones reducing the audio bitrate as much as possible.

After splitting the optimal session bitrate into an optimal audio bitrate and an optimal video bitrate, bitrate splitter provides (306) the optimal audio bitrate to audio encoder 222 and provides (308) the optimal video bitrate to video encoder 224. Upon receiving their respective bitrate, both audio encoder 222 and video encoder 224 receive their respective media data from buffer 212 and output their respective audio media data and video media data according to the respective bitrate allocation from bitrate splitter 220. After the bitrate has been determined for both audio and video, it is the responsibility of each encoder to deliver maximum quality in the corresponding media track by maintaining the requested bitrate until the next RTCP interval. For example, audio encoder 222 can generate variable bitrates by adjusting quantization and cutoff frequency. Further, video encoder 224 can generate variable bitrates, for example, by adjusting Discrete Cosine Transform (DCT) coefficient quantization or by introducing frame dropping. This frame dropping can be executed, when needed, by frame dropper 226. In some embodiments, the encoding parameters of the encoders are not modified until they receive optimal bitrate data from bitrate splitter 220, which would be provided in a subsequent RTCP interval, because the encoders 222, 224 are slave devices to bitrate splitter 220.

In some embodiments, where frame dropping is preferred, video encoder 224 can provide (310) the video media data to frame dropper 226 when the optimal session bitrate is less than a quality threshold. This threshold can be codec dependent, and represents the bitrate value below which the use of coarser quantization leads to intolerable artifacts in the image. When frame dropping is triggered, frame dropper 226 can dynamically determine a frame dropping rate based on the desired video bitrate and the bitrate being generated by video encoder 224. To compensate inherent bitrate fluctuations in the video bitrate at the output of video encoder 224, frame dropper 226 can dynamically update the dropping rate by using a sliding window covering the byte size history of recently encoded frames. Frame dropper 226 can drop the frames accordingly to deliver the optimal session bitrate. In addition, in some embodiments, video encoder 224 can utilize the network state estimator of adaptive bitrate controller 210 to encode video in a more resilient manner. In some embodiments, packet loss information can be used in conjunction with the MTT by video encoder 224 to determine if a Group of Picture (GOP) value should be reduced, increasing the number of I-Frames per second sent in the video stream. In some embodiment, if frame dropping is not needed, video encoder 224 can simply provide the video media data to RTP packetization 216. Audio encoder 222 and, for this embodiment, frame dropper 226 provide (312, 314) the audio media data and the video media data, respectively, to RTP packetization 216.

Upon receiving the audio media data and the video media data, RTP packetization 216 translates this data into a packet format. RTP defines a standardized packet format for delivering audio and video over the Internet. Upon translating this data into a packet format, RTP packetization 216 transmits (316) the audio and video media packets to network buffer 230 of network 106. While only one transmission is shown, one of ordinary skill in the art will appreciate that transmission 316 can include separate transmission for one or more audio media packets and another for one or more video media packets. Furthermore, one of ordinary skill in the art will appreciate that network 106 can include multiple networks, each having their own one or more buffers. Besides carrying the audio and media data, these packets can include, among other things, a payload-type identifier, a packet sequence number, a timestamp, and delivery monitoring data. This type of data can later assist adaptive bitrate controller 210 in determining the quality of service provided by the network when adaptive bitrate controller 210 receives the RTCP receiver report from terminal 102. Moreover, adaptive bitrate manager 108 can also store a history of sent RTP packets so that it can later adjust the bitrate accordingly.

Upon receiving the packets, network buffer 230 of network 106 can store the packets until it is the packets turn to be provided to terminal 102. While only buffer 230 is illustrated, one of ordinary skill in the art will appreciate that one or more separate buffers can exist for each of the audio media packets and the video media packets. When it is the packets turn, network buffer 230 transmits (318) the packets to terminal buffer 204.

Upon receiving the packets, terminal buffer 204 of terminal 102 can store the packets until it is the packets turn to be provided to media player 202. While only buffer 230 is illustrated, one of ordinary skill in the art will appreciate that one or more separate buffers can exist for each of the audio media packets and the video media packets. When it is the packets turn, buffer 204 provides (320) the packets to media player 202. In turn, media player 202 can extract the relevant data out of packets and provide this data to adaptive bitrate manager 108 in a subsequent RTCP receiver report.

Figure 4:
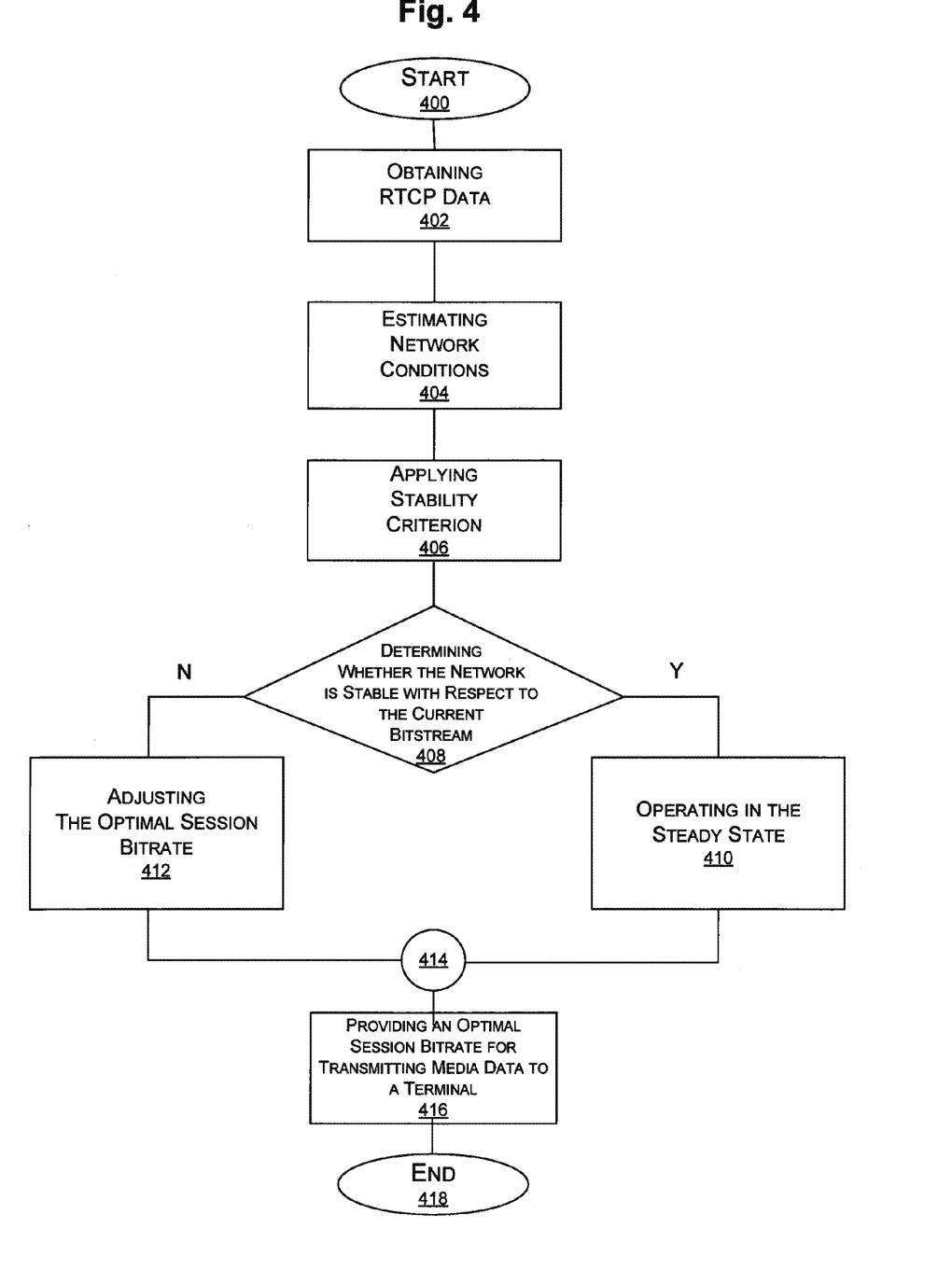
FIG. 4 is a flowchart representing an exemplary method for processing an RTCP packet.

FIG. 4 is a flowchart representing an exemplary method for processing an RTCP packet. Referring to FIG. 4, it will be readily appreciated by one of ordinary skill in the art that the illustrated procedure can be altered to delete steps or further include additional steps. It is assumed for this exemplary method that RTCP packet includes data concerning both audio and video media data. While both types exists, one of ordinary skill in the art will appreciate that RTCP data can include either audio or video data. After initial start step 400, an adaptive bitrate manager obtains (402) RTCP data, which can include one or more RTCP receiver reports. This RTCP data can correlate to the quality and quantity of audio and video media packets received at a media player of a terminal. The RTCP data can include, among other things, a sequence number of a last packet received by the terminal, a timestamp corresponding to such packet, a number of bits sent, a round trip time, and number of packets lost during a transmission from the adaptive bitrate manager to the terminal. RTCP data can be obtained by receiving an RTCP report from the terminal and by cross-correlating the contents of the last received RTCP packet with the history of RTP packets stored at the adaptive bitrate manager.

After receiving RTCP data, the adaptive bitrate manager estimates (404) network conditions of a streaming media network. To estimate the state of the network, the adaptive bitrate manager can combine data from the received RTCP data from step 402 and previously received RTCP data stored by the adaptive bitrate manager. Adaptive bitrate controller can estimate an MTT, a bitrate received, an RTTE, and a packet loss. The adaptive bitrate manager can use these estimates to implement several different control algorithms.

After estimating the network conditions, the adaptive bitrate manager applies (406) stability criterion to determine the stability of the streaming media network. If needed, the stability criterion can assist in adjusting the bitrate for attempting to stabilize the streaming media network, e.g., such as avoiding buffer overflows in the network and underflows at the terminal. While any number of algorithms can be used to determine the stability criterion, one exemplary embodiment compares the estimated MTT with the estimated RTTE, both of which are estimated in step 404. If the MTT and the RTTE remain close, the adaptive bitrate manager can use this comparison to determine that the streaming media network can properly support the current bitrate. Further, by comparing the bitrate received with the current bitrate session, the adaptive bitrate manager can determine that the streaming media network can cope with the load.

After establishing the stability criterion, the adaptive bitrate manager determines (408) whether the network is stable with respect to the current bitstream based on estimation step 404 and/or stability criterion establishment step 406. If the network is stable, the adaptive bitrate manager operates (410) in a steady state condition by either maintaining or incrementally increasing the current bitrate. In some embodiments, the optimal session bitrate can be computed by determining the difference between the MTT and the RTTE and adjusting the session bitrate according to the difference. For example, if the current session bitrate is less than a set target session bitrate, the adaptive bitrate manager can incrementally increase the optimal session bitrate if the values of the MTT and the RTTE are comparable. Then, the adaptive bitrate manager provides (416) an optimal session bitrate for transmitting media data to a terminal. After providing step 416, the method can proceed to end 418.

If determining that the network is not stable, the adaptive bitrate manager adjusts (412) the bitrate so that adaptive bitrate manager can reach a stable condition. For example, in some embodiments, the adaptive bitrate manager can use the estimated bitrate received from step 404 because, in some embodiments, the bitrate received can be the best estimation of the actual bitrate that the network can support at that particular point in time. Then, the adaptive bitrate manager provides (416) the optimal session bitrate for transmitting media data to the terminal. After providing step 416, the method can proceed to end 418.

Figure 5:
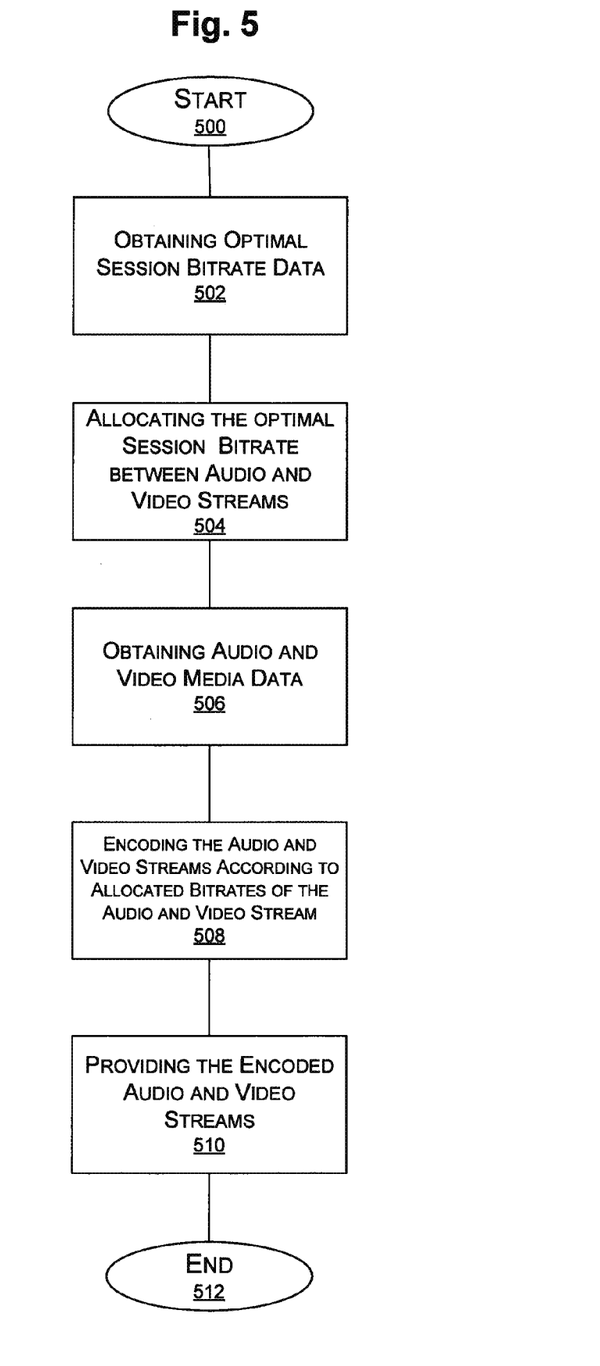
FIG. 5 is a flowchart representing an exemplary method for processing optimal session bitrate data.

FIG. 5 is a flowchart representing an exemplary method for processing optimal session bitrate data. Referring to FIG. 5, it will be readily appreciated by one of ordinary skill in the art that the illustrated procedure can be altered to delete steps or further include additional steps. It is assumed for this exemplary method that both audio and video media data exists. While both types exists, one of ordinary skill in the art will appreciate that either audio or video data can exist. After initial start step 500, an adaptive bitrate manager obtains (502) optimal session bitrate data for transmitting media data to a terminal.

Upon receiving the optimal session bitrate data, the adaptive bitrate manager allocates (504) the optimal session bitrate between audio and video streams to produce an optimal audio bitrate and an optimal video bitrate. For example, this allocation could be based on a predetermined allocation, user preference, optimal performance data, privileging one type of data over the other, the amount of audio and video data to be provided, and/or any combination of the above. For example, the adaptive bitrate manager may privilege audio quality in a way that if a reduced bitrate is specified, the adaptive bitrate manager can reduce the video bitrate first and postpone reducing the audio bitrate as much as possible.

Adaptive bitrate manager obtains (506) audio and video media data. In some embodiments, obtaining step 506 can occur prior to allocating step 504 or obtaining step 502. After allocating step 504 and obtaining step 506, the adaptive bitrate manager encodes (508) the audio and video media data according to their respective allocated bitrate specified at step 504.

After encoding the audio and video streams according to the allocated bitrate, the adaptive bitrate manager provides (510) the encoded audio and video media data for transmitting to the terminal. In some embodiments, an RTP packetization receives the encoded audio and video media data and translates this data into a packet format. RTP defines a standardized packet format for delivering audio and video over the Internet. Upon translating this data into a packet format, the RTP packetization can then transmit the audio and video media packets to the terminal. After providing the encoded audio and video media data, the method can proceed to end 512.

The methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

In the preceding specification, the invention has been described with reference to specific exemplary embodiments. It will however, be evident that various modifications and changes may be made without departing from the broader spirit and scope of the invention as set forth in the claims that follow. The specification and drawings are accordingly to be regarded as illustrative rather than restrictive. Other embodiments of the invention may be apparent to those skilled in the art from consideration of the specification and practice of the invention disclosed herein.

What is claimed is:

1. A method comprising:
   receiving media data that includes audio media data and video media data;
   receiving a receiver report from a terminal;
   estimating one or more network conditions of a media network using the receiver report;
   determining an optimal session bitrate using the estimated one or more network conditions;
   allocating the optimal session bitrate between audio media data and video media data to produce an optimal audio bitrate and an optimal video bitrate;
   encoding the audio media data using the optimal audio bitrate;
   encoding the video media data using the optimal video bitrate; and
   providing the encoded audio media data and the encoded video media data for transmission to the terminal.

2. The method of claim 1, wherein the receiver report is selected from a group including a real-time transport control protocol (RTCP) receiver report, and a real-time transport control protocol extended reports (RTCP XR) receiver report.

3. The method of claim 1, further comprising dropping frames of the encoded video data.

4. The method of claim 1, wherein allocating the optimal session bitrate between the audio media data and the video media data is based on one or more metrics selected from a group including a predetermined allocation, a user preference, an optimal performance data, privileging one type of media data over the other, and an amount of audio and video media data to be provided.

5. The method of claim 1, wherein determining the optimal session bitrate further comprises:
   establishing stability criterion based on the estimated one or more network conditions;
   determining the stability of the media network; and
   providing the optimal session bitrate based on the stability determination.

6. The method of claim 5, wherein establishing stability criterion further comprises:
   comparing a media time in transit and a round trip time estimate for assisting with the stability determination.

7. The method of claim 5, wherein establishing stability criterion further comprises:
   comparing a bitrate received with a current bitrate session.

8. The method of claim 5, further comprising:
   if the stability of the media network is considered normal, maintaining or incrementally increasing a current bitrate; and
   if the stability of the media network is not normal, adjusting the current bitrate.

9. A method comprising:
   receiving media data that includes audio media data and video media data;
   receiving an optimal session bitrate;
   allocating the optimal session bitrate between the audio media data and the video media data to produce an optimal audio bitrate and an optimal video bitrate;
   encoding the audio media data using the optimal audio bitrate;
   encoding the video media data using the optimal video bitrate;
   dropping frames of the encoded video data; and
   providing the encoded audio media data and remaining encoded video media data for transmittal to a terminal.

10. The method of claim 9, wherein allocating the optimal session bitrate between the audio media data and the video media data is based on one or more metrics selected from a group including a predetermined allocation, a user preference, an optimal performance data, privileging one type of media data over the other, and an amount of audio and video media data to be provided.

11. A terminal including one or more processors and a memory, the terminal comprising:

a buffer configured to receive media data packets transmitted by an adaptive bitrate manager over a media network; and a media player configured to receive media data packets and provide a receiver report to the adaptive bitrate manager configured to:

receive media data that includes audio media data and video media data; receive the receiver report, estimate one or more network conditions of the media network using the receiver report, determine an optimal audio bitrate and an optimal video bitrate using estimated one or more network conditions, encode the audio media data using the optimal audio bitrate, encode the video media data using the optimal video bitrate, and provide the encoded audio media data and the encoded video media data for transmission as media data packets.

12. A system comprising:

an adaptive bitrate manager configured to estimate one or more network conditions of a media network between the adaptive bitrate manager and a terminal, to determine an optimal session bitrate using the estimated one or more network conditions, and to acquire media data that includes audio media data and video media data, the adaptive bitrate manager further comprising:

a bitrate splitter configured to allocate the optimal session bitrate between audio media data and video media data to produce an optimal audio bitrate and an optimal video bitrate, and one or more encoders configured to:

encode the audio media data using the optimal audio bitrate, encode the video media data using the optimal video bitrate, and provide the encoded audio media data and the encoded video media data for transmission to the terminal.

13. The system of claim 12, wherein the adaptive bitrate manager further comprises:

an adaptive bitrate controller configured to determine the optimal session bitrate.

14. The system of claim 12, wherein the adaptive bitrate manager includes one or more processors.

15. A non-transitory computer readable storage medium storing instructions that, when executed by one or more computers, cause the one or more computers to perform a method for processing a receiver report, the method comprising:

receiving media data that includes audio media data and video media data;

receiving the receiver report from a terminal;

estimating one or more network conditions of a media network using the receiver report;

determining an optimal session bitrate using the estimated one or more network conditions;

allocating the optimal session bitrate between audio media data and video media data to produce an optimal audio bitrate and an optimal video bitrate;

encoding the audio media data using the optimal audio bitrate;

encoding the video media data using the optimal video bitrate; and providing the encoded audio media data and the encoded video media data for transmission to the terminal.

16. A non-transitory computer readable storage medium storing instructions that, when executed by one or more computers, cause the one or more computers to perform a method for processing an optimal session bitrate, the method comprising:

receiving media data that includes audio media data and video media data;

receiving the optimal session bitrate;

allocating the optimal session bitrate between the audio media data and the video media data to produce an optimal audio bitrate and an optimal video bitrate;

encoding the audio media data using the optimal audio bitrate;

encoding the video media data using the optimal audio bitrate and the optimal video bitrate dropping frames of the encoded video data; and providing the encoded audio media data and remaining encoded video media data for transmittal to a terminal.

17. The non-transitory computer readable storage medium of claim 15, wherein allocating the optimal session bitrate between the audio media data and the video media data is based on one or more metrics selected from a group including a predetermined allocation, a user preference, an optimal performance data, privileging one type of media data over the other, and an amount of audio and video media data to be provided.

18. The non-transitory computer readable storage medium of claim 15, wherein determining the optimal session bitrate further comprises:

establishing stability criterion based on the estimated one or more network conditions;

determining the stability of the media network; and providing the optimal session bitrate based on the stability determination.

19. The non-transitory computer readable storage medium of claim 18, wherein establishing stability criterion further comprises one or more of the following operations:

comparing a media time in transit and a round trip time estimate for assisting with the stability determination; or comparing a bitrate received with a current bitrate session.

20. The non-transitory computer readable storage medium of claim 16, wherein allocating the optimal session bitrate between the audio media data and the video media data is based on one or more metrics selected from a group including a predetermined allocation, a user preference, an optimal performance data, privileging one type of media data over the other, and an amount of audio and video media data to be provided.

* * * * *